United States Patent [19]

Wassermann et al.

[11] 4,175,118

[45] Nov. 20, 1979

[54] METHOD FOR MANUFACTURING A HIGH POROUS ALUMINA HAVING A LARGE SURFACE AREA AND A LOW BULK DENSITY

[75] Inventors: Martin Wassermann, Hamburg; Klaus Noweck, Brunsbüttel; Arnold Meyer, Michaelisdonn, all of Fed. Rep. of Germany

[73] Assignee: Condea Chemie GmbH, Fed. Rep. of Germany

[21] Appl. No.: 908,626

[22] Filed: May 23, 1978

Related U.S. Application Data

[63] Continuation of Ser. No. 746,747, Dec. 2, 1976, abandoned.

[30] Foreign Application Priority Data

Dec. 17, 1975 [DE] Fed. Rep. of Germany ....... 2556804

[51] Int. Cl.² .............................................. C01F 7/02
[52] U.S. Cl. .................................. 423/628; 423/630; 423/631
[58] Field of Search .................... 423/628, 630, 631

[56] References Cited

U.S. PATENT DOCUMENTS

| | | | |
|---|---|---|---|
| 2,970,891 | 2/1961 | Hinlicky | 428/630 |
| 2,970,892 | 2/1961 | Kirshenbaum et al. | 428/628 |
| 3,042,696 | 7/1962 | Aldridge | 428/630 |
| 3,647,374 | 3/1972 | Normura et al. | 428/630 |
| 3,898,322 | 8/1975 | Leach | 428/630 |
| 3,941,719 | 3/1976 | Yoldas | 428/630 |
| 3,987,155 | 10/1976 | Ziegenhain | 428/630 |

FOREIGN PATENT DOCUMENTS

| | | | |
|---|---|---|---|
| 1182643 | 12/1964 | Fed. Rep. of Germany | 423/630 |
| 2246094 | 7/1975 | Fed. Rep. of Germany | 423/630 |
| 667145 | 2/1952 | United Kingdom | 423/630 |
| 862846 | 3/1961 | United Kingdom | 423/630 |
| 931936 | 7/1963 | United Kingdom | 423/630 |

*Primary Examiner*—Herbert T. Carter
*Attorney, Agent, or Firm*—Cushman, Darby & Cushman

[57] ABSTRACT

A highly porous alumina having a large surface area and a low bulk density is prepared by hydrolyzing an aluminum alcoholate at a temperature of 40° to 90° C. in an aqueous solution containing 8 to 30% by weight of a compound which upon drying or activating splits out $NH_3$ and/or $CO_2$, there being used 0.5 to 3 parts by weight of the compound per 10 parts of aluminum alcoholate. The aluminum oxyhydrate paste formed by the hydrolysis is separated from the alcohol phase, in a given case is also purified, and subsequently dried or activated.

10 Claims, No Drawings

METHOD FOR MANUFACTURING A HIGH POROUS ALUMINA HAVING A LARGE SURFACE AREA AND A LOW BULK DENSITY

This is a continuation of application Ser. No. 746,747 filed Dec. 2, 1976, and now abandoned.

The invention is directed to a process for the production of a highly porous alumina product having a large surface area and a low bulk density by hydrolyzing an aluminum alcoholate in an aqueous solution and subsequently drying and/or activating of the aluminum oxyhydrate paste separated from the alcohol phase.

Alumina or aluminum oxide, $Al_2O_3$, is employed as a catalyst or catalyst carrier for numerous chemical reactions, especially in the petroleum industry. In most processes of production there is obtained little porosity and correspondingly dense aluminum oxide products which are less effective and uneconomical. Especially pure alumina products or aluminum oxyhydrate are obtained according to the Ziegler process as shown by Weingaertner German Pat. No. 1,258,854 and Acciarri German Offenlegungsschrift No. 1,592,076 by hydrolysis of aluminum alcoholates of $C_2$ to $C_{24}+$ alcohols in an approximate Poisson distribution, if these alkoxides are hydrolyzed in aqueous solution after which the aluminum oxyhydrate paste is separated from the aqueous alcohol phase, extracted and dried. The aluminum oxyhydrate obtained can be calcined or activated; the thus obtained alumina is employed predominantly for catalysts and catalyst carriers for petrochemical and chemical processes as well as in waste gas purification catalysts. The entire disclosure of German Pat. No. 1,258,854 and German OS No. 1,592,076 is hereby incorporated by reference and relied upon.

In the working examples below there was employed a mixed aluminum alcoholate from $C_2$ to $C_{24}$ alkanols and made by the Ziegler process. There can also be used, however, individual alcoholates, e.g., aluminum tris (isobutylate), aluminum tributylate or aluminum tripropylate or other mixtures of aluminum alcoholates, e.g., a mixed aluminum alcoholate from a mixture of $C_4$ to $C_{20}$ straight chain alcohols which alcoholate is made by the Ziegler process.

Since the areas of use of alumina are affected by the active surface area, the bulk density and the pore volume, the art has sought to obtain lighter or highly porous alumina products in place of the presently customary alumina having a surface area below 270 $m^2/g$, a bulk density of more than 0.5 g/ml and pore volumes below 1.0 ml/g.

According to a known process by hydrolysis of aluminum alcoholates which are prepared according to the Ziegler process there is obtained a so-called light alumina with a surface area of 260 to 400 $m^2/g$, a bulk density of 0.1 to 0.4 g/ml and a pore volume of 1.0 to 2.75 ml/g, e.g., according to Ziegenhain German Offenlegungsschrift No. 2,250,892. The alumina paste obtained by hydrolysis of the aluminum alcoholates after separation of the aqueous alcoholic phase and removal of the long chain alcohols by solvent extraction is brought into contact with a sufficient amount of an organic solvent, usually butanol, and is subsequently dried. Although there is obtained a highly porous alumina by this process, however, there appear considerable disadvantages in an industrial process since the almost 80 weight % of water present in the alumina paste must be drawn off azeotropically by the solvent. This means that it is necessary to work with large amounts of solvent, preferably butanol, in order to dewater the alumina paste. The recovery of the solvent, as well as the subsequent drying of the alumina paste are extraordinarily expensive process steps.

The entire disclosure of the Ziegenhain German OS is hereby incorporated by reference and relied upon. There can be used as the starting material in the present invention the mixture of aluminum alcoholates with alkoxy groups containing 1 to 30 carbon atoms as shown on page 10 of Ziegenhain or more preferably 2 to 30 carbons as shown on page 15 of Ziegenhain. This German Offenlegungsschrift corresponds to Ziegenhain U.S. Pat. No. 3,987,155 which shows the mixtures of aluminum alcoholates just described on Col. 5, lines 32–35, and Col. 7, lines 5–13.

The invention therefore had the problem of development of a simple process for the production of highly porous alumina with a surface area of about 300 to 400 $m^2/g$ or even up to 420 $m^2/g$, a bulk density of 0.13 to 0.3 g/ml and a pore volume of 1.1 to 2.1 ml/g, wherein at least 50% of the pore diameters are $<1000$ Å.

The solution of this problem starts with a process of the art mentioned initially, wherein according to the invention aluminum alcoholates are hydrolyzed in an aqueous solution at temperatures from 40° to 90° C. The aqueous solution contains 8 to 30 weight % of a compound which upon drying or activating the alumina splits off $NH_3$ and/or $CO_2$, the amount of said compound being from 0.5 to 3.0 parts by weight per 10 parts by weight of aluminum alcoholate.

The aluminum alcoholates can be those mentioned above, for example.

The aqueous hydrolysis solution preferably contains 10 to 15% of the compound splitting off $NH_3$ and/or $CO_2$. Furthermore, this compound is preferably present in an amount of 1 to 2 parts by weight for each 10 parts by weight of aluminum alcoholate.

Especially good results are produced if there are used as the compound splitting out $NH_3$ and/or $CO_2$ ammonium bicarbonate, $NH_4HCO_3$, although similar good results are also obtained with ammonium carbonate, urea, hexamethylenetetramine or ammonium acetate. The use of alkali bicarbonates, e.g., sodium bicarbonate or potassium carbonate is suitable only in those cases where it is not disturbing to the intended use to have alkali ions built into the product.

Surprisingly, it has been found that by the process of the invention there is obtained in a very much simpler and more economical manner highly porous alumina products having a large surface area and low bulk density wherein, in contrast to the known processes, water in the aluminum oxyhydrate paste can be tolerated or even be necessary as the solvent for the compound splitting off $NH_3$ and/or $CO_2$ and there can be eliminated the entire expensive butanol treatment including the azeotropic drawing off of the adhering water. In addition the process of the invention is carried out at lower temperatures which likewise favorably influence the desired properties of the end product, as, e.g., the amorphous portion.

In an especially preferred form of the process of the invention the hydrolysis is begun in a solution which is highly concentrated in regard to the content of compound splitting out $NH_3$ and/or $CO_2$, wherein this solution in the second step is subsequently diluted with water to the desired concentration of 8 to 30 weight % and the hydrolysis is continued. In this two step process likewise there are obtained very much better products than in the one step process. In the two step process the concentration of the compound forming $NH_3$ and/or $CO_2$ in water can be from above 20%, e.g., 30% up to saturation point.

According to another modification of the process of the invention, likewise a two step procedure, the hydrolysis is begun in a lower temperature range of 40° to 60° C. and continued further at a higher temperature range up to 90° C. Products with better properties are obtained in this manner also than if the entire hydrolysis is carried out in one step at, for example, 75° C.

The invention will be illustrated further in the following examples.

Unless otherwise indicated, all parts and percentages are by weight.

The process can comprise, consist essentially of or consist of the steps set forth with the materials set forth.

EXAMPLE 1

100 grams of mixed aluminum alcoholates of $C_2$ to $C_{24}+$ alkanols were hydrolyzed at 90° C. in 30% aqueous $NH_4HCO_3$ solution at an alkoxide:$H_2O$ ratio of 1:1 in a 1 liter glass flask equipped with stirrer, dropping funnel and reflux condenser. After 30 minutes the alcohol was drawn off from the slurry phase and the latter extracted twice at 90° C. with 80% butanol. The filtered product was dried preliminarily at 110° C. and subsequently dried for a short time at 550° C. to an $Al_2O_3$ content of 78%. The powder obtained after activating for 3 hours at 550° C. had the following physical data:

| | |
|---|---|
| Surface area | about 350 m²/g |
| Pore volume | about 1.3 ml/g |
| Bulk density (before activation) | about 0.22 g/ml |

EXAMPLE 2

514 Grams of the same mixed aluminum alcoholate employed in Example 1 was hydrolyzed at 90° C. with a 20% aqueous $NH_4HCO_3$ solution (550 grams $H_2O$ and 138 grams $NH_4HCO_3$) in an autoclave equipped with a stirrer. After 30 minutes the alcohol phase was drawn off and the slurry was extracted twice at 90° C. with 80% butanol.

The solid material was filtered off, preliminarily dried at 120° C. and after further drying at 300° C. had an $Al_2O_3$ content of 75%.

The powder obtained had the following properties after activating for 3 hours at 550° C.:

| | |
|---|---|
| Surface area | about 340 m²/g |
| Pore volume | about 1.9 ml/g |
| Bulk density (before activation) | about 0.3 g/ml |

EXAMPLE 3

257 grams of the same mixed aluminum alcoholate as employed in Example 1 were placed in a glass flask and hydrolyzed at 60° C. with a solution of 35 grams of $NH_4HCO_3$ in 119 ml. of water. There were added to the slurry formed 139 ml. of water and the mixture allowed to react for a further 15 minutes at 90° C. so that there was employed a total reaction time of 30 minutes. The alcohol phase was separated off and extracted twice with 80% butanol.

The solid material filtered off was dried at 120° C. and then at 300° C. to obtain an $Al_2O_3$ content of 76%.

The powder after activating for 3 hours at 550° C. had the following properties:

| | |
|---|---|
| Bulk density (before activation) | about 0.27 g/ml |
| Surface area | about 340 m²/g |
| Pore volume | about 1.18 ml/g |
| Pore diameter distribution | |
| 0–30 Å | 0.23 ml/g |
| 0–40 Å | 0.35 ml/g |
| 0–50 Å | 0.42 ml/g |
| 0–60 Å | 0.47 ml/g |
| 0–70 Å | 0.52 ml/g |
| 0–80 Å | 0.55 ml/g |
| 0–90 Å | 0.59 ml/g |
| 0–100 Å | 0.62 ml/g |
| 0–150 Å | 0.77 ml/g |
| 0–200 Å | 0.87 ml/g |
| 0–300 Å | 0.96 ml/g |
| 0–400 Å | 1.00 ml/g |
| 0–500 Å | 1.03 ml/g |
| 0–10,000 Å | 1.18 ml/g |

EXAMPLE 4

The procedure was the same as in Example 3 except there were added 35 grams of hexamethylenetetramine in place of the $NH_4HCO_3$. After drying first at 120° C. and then at 300° C. there was formed a powder having an $Al_2O_3$ content of 75%. which activating at 550° C. for 3 hours showed the following properties:

| | |
|---|---|
| Surface area | about 330 m²/g |
| Pore volume | about 1.1 ml/g |
| Bulk density (before activation) | about 0.30 g/ml |

EXAMPLE 5

514 grams of the same mixed aluminum alkoxide employed in Example 1 were hydrolyzed at 90° C. for 30 minutes in an autoclave in a 14% aqueous $NH_4HCO_3$ solution (500 grams of water and 70 grams of $NH_4HCO_3$). After drying as in Example 4 there was formed from the extracted slurry phase 79% $Al_2O_3$ as a powder which after activating for 3 hours at 550° C. had the following properties:

| | |
|---|---|
| Surface area | about 340 m²/g |
| Pore volume | about 1.03 ml/g |
| Bulk density (before activation) | about 0.3 g/ml |

EXAMPLE 6

514 grams of the same mixed aluminum alkoxide employed in Example 1 were hydrolyzed in an autoclave in such manner that it was metered in at 90° C. to 54 grams of water and 57 grams of $NH_4HCO_3$; subsequently a further 460 grams of water were added and hydrolysis continued for a total hydrolysis time of 35 minutes. The slurry after extraction and drying as in Example 3 had an $Al_2O_3$ content of 75% and a bulk density of 0.3 g/ml.

After activating for 3 hours at 550° C., the following values of the powder were measured:

| | |
|---|---|
| Surface area | about 340 m²/g |
| Pore volume | about 1.23 ml/g |

When the initial amount of water was varied from 54 grams to 250 grams, but the entire amount of water held constant, the same results were obtained.

EXAMPLE 7

514 grams of the same mixed aluminum alkoxide employed in Example 1 were added to an 11% $NH_4HCO_3$ solution (550 grams of $H_2O$ and 70 grams of $NH_4HCO_3$) in an autoclave at 60° C. and after 20 minutes the mixture was heated to 90° C. and hydrolysis continued for another 10 minutes.

The alumina hydrate powder formed after the extraction and drying had an $Al_2O_3$ content of 63% and a bulk density of 0.3 g/ml.

After activating for 3 hours at 550° C., the following values were measured on the powder:

| | |
|---|---|
| Surface area | about 340 m²/g |
| Pore volume | about 1.23 ml/g |

EXAMPLE 8

514 grams of the same mixed aluminum alkoxide as employed in Example 1 were hydrolyzed in an autoclave in 30 minutes at 40° C. in an 11% ammonium bicarbonate solution (550 grams of $H_2O$ and 70 grams of $NH_4HCO_3$) and the alumina slurry extracted and dried. The powder had an $Al_2O_3$ content of 85% and a bulk density of 0.24 g/ml. After activating for 3 hours at 550° C., there were measured the following values:

| | |
|---|---|
| Surface area | about 340 m²/g |
| Pore volume | about 1.8 ml/g |

EXAMPLE 9

The procedure was the same as in Example 8, except that the hydrolysis was carried out at 60° C. The powder after drying had an $Al_2O_3$ content of 78% and a bulk density of 0.2 g/ml. After activating for 3 hours at 550° C., the following values were measured:

| | |
|---|---|
| Surface area | about 330 m²/g |
| Pore volume | about 2.1 ml/g |
| Pore diameter distribution | |
| 30 Å | 0.21 ml/g |
| 40 Å | 0.37 ml/g |
| 50 Å | 0.41 ml/g |
| 60 Å | 0.44 ml/g |
| 70 Å | 0.48 ml/g |
| 80 Å | 0.50 ml/g |
| 90 Å | 0.52 ml/g |
| 100 Å | 0.54 ml/g |
| 150 Å | 0.63 ml/g |
| 300 Å | 0.86 ml/g |
| 500 Å | 1.06 ml/g |
| 800 Å | 1.17 ml/g |
| 1,000 Å | 1.25 ml/g |
| 10,000 Å | 1.81 ml/g |

EXAMPLE 10

The procedure was the same as in Example 8 except that the hydrolysis was carried out at 90° C. and there was used 70 grams of $(NH_4)_2CO_3$ rather than ammonium bicarbonate.

The powder after drying had an $Al_2O_3$ content of 77% and a bulk density of 0.3 g/ml. After activating for 3 hours at 550° C., the following values were measured:

| | |
|---|---|
| Surface area | about 320 m²/g |
| Pore volume | about 1.1 ml/g |

EXAMPLE 11

514 grams of the same mixed aluminum alkoxide as employed in Example 1 were hydrolyzed in an autoclave at 60° C. in a bicarbonate solution consisting of 550 grams of $H_2O$ and 70 grams of $NH_4HCO_3$ in such manner that the alkoxide was fed in 30 minutes and allowed to further react for 15 minutes. The alcohol phase was drawn off and the slurry extracted twice at 60° C. with 80% butanol. The solid material was filtered off and dried preliminarily at 120° C. and after drying at 300° C. there was obtained an $Al_2O_3$ content of 84.1% and a bulk density of 0.13 g/ml.

After activating at 550° C. for 3 hours, the powder had the following properties:

| | |
|---|---|
| Surface area | about 420 m²/g |
| Pore volume | about 1.63 ml/g |

What is claimed is:

1. A process of preparing a highly porous alumina having a surface area of about 300 to 420 m²/g, a bulk density of 0.13 to 0.3 g/ml and a pore volume of 1.1 to 2.1 ml/g and wherein at least 50% of the pore diameters are less than 1000 Å comprising hydrolyzing an aluminum alcoholate which is an alimimum alkanolate of an alkanol having 1 to 30 carbon atoms at a temperature of 40° to 90° C. in an aqueous solution containing 8 to 30% by weight of a compound which upon drying or activating the alumina formed decomposes to form $NH_3$ or a mixture of $NH_3$ and $CO_2$, said decomposing compound being ammonium carbonate, ammonium bicarbonate, urea, or ammonium acetate, there being used 0.5 to 3 parts by weight of said compounds per 10 parts of aluminum alcoholate, separating the aluminum oxyhydrate paste formed by the hydrolysis from the alcohol phase, and subsequently drying the alumina.

2. A process according to claim 1 including the step of activating the alumina by heating.

3. A process according to claim 1 wherein the aqueous solution contains 10 to 15 weight % of said compound decomposing to form $NH_3$ or a mixture of $NH_3$ and $CO_2$.

4. A process according to claim 3 wherein said decomposing compound is used in an amount of 1 to 2 parts by weight per 10 parts by weight of aluminum alcoholate.

5. A process according to claim 4 wherein the decomposing compound is ammonium bicarbonate.

6. A process according to claim 1 wherein the decomposing compound is ammonium bicarbonate.

7. A process according to claim 1 wherein the hydrolysis is begun with a concentration in water of the compound decomposing to form $NH_3$ or a mixture of $NH_3$ and $CO_2$ above 20 weight % and thereafter the concentration is reduced to 8 to 30 weight % by adding water.

8. A process according to claim 7 wherein the initial concentration of said decomposing compound is at least 30 weight %.

9. A process according to claim 1 wherein the hydrolysis is carried out in a plurality of steps, first at a temperature of 40° to 60° C. and second at a higher temperature up to 90° C.

10. A process according to claim 9 wherein the hydrolysis at 40° to 60° C. is carried out with a concentration in water of the compound decomposing to form $NH_3$ or a mixture of $NH_3$ and $CO_2$ above 20 weight % and the hydrolysis at said higher temperature is carried out with a concentration of said decomposing compound of 8 to 30 weight %.

* * * * *